(12) United States Patent
Takano et al.

(10) Patent No.: US 8,985,041 B2
(45) Date of Patent: Mar. 24, 2015

(54) AIR LUBRICATION SYSTEM OF SHIP

(75) Inventors: Shinichi Takano, Tokyo (JP); Shuji Mizokami, Tokyo (JP); Seijiro Higasa, Tokyo (JP); Chiharu Kawakita, Tokyo (JP); Makoto Kawabuchi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 13 days.

(21) Appl. No.: 13/805,747

(22) PCT Filed: Mar. 29, 2011

(86) PCT No.: PCT/JP2011/057805
§ 371 (c)(1),
(2), (4) Date: Dec. 20, 2012

(87) PCT Pub. No.: WO2012/042948
PCT Pub. Date: Apr. 5, 2012

(65) Prior Publication Data
US 2013/0098285 A1 Apr. 25, 2013

(30) Foreign Application Priority Data
Sep. 27, 2010 (JP) ................................. 2010-216137

(51) Int. Cl.
*B63B 1/38* (2006.01)
*B63H 1/28* (2006.01)

(52) U.S. Cl.
CPC .. *B63B 1/38* (2013.01); *B63H 1/28* (2013.01); *B63B 2001/387* (2013.01); *Y02T 70/122* (2013.01); *B63H 2001/286* (2013.01)
USPC ....................................................... 114/67 A

(58) Field of Classification Search
USPC ................................................ 114/67 A, 289
See application file for complete search history.

(56) References Cited

U.S. PATENT DOCUMENTS

| | | | | |
|---|---|---|---|---|
| 3,289,623 A | * | 12/1966 | Gray et al. | ................. 114/67 A |
| 5,967,071 A | | 10/1999 | Wipper | |
| 6,186,085 B1 | * | 2/2001 | Kato et al. | ................. 114/67 A |
| 2010/0236466 A1 | | 9/2010 | Costas | |

FOREIGN PATENT DOCUMENTS

| | | |
|---|---|---|
| CN | 1280540 | 1/2001 |
| EP | 2 272 747 | 1/2011 |

(Continued)

OTHER PUBLICATIONS

International Preliminary Report on Patentability and Written Opinion of the International Searching Authority issued Apr. 16, 2013 in International (PCT) Application No. PCT/JP2011/057805.

(Continued)

*Primary Examiner* — Edwin Swinehart
(74) *Attorney, Agent, or Firm* — Wenderoth, Lind & Ponack, L.L.P.

(57) ABSTRACT

An air lubrication system of an outer installation type has good efficiency. An air recovering device includes a recovery side chamber provided on a bottom of a ship on a stern side from an air ejecting device which supplies air bubbles to the ship bottom. The recovery side chamber includes air intake holes formed in a portion of the recovery side chamber opposite to the ship bottom through a gap. The air recovering device also includes a recovering section recovering air inside a recovery side chamber. The air bubbles acquired from the air intake holes are accumulated inside the recovery side chamber to generate pushing pressure so that air can be smoothly recovered from the recovering section.

11 Claims, 7 Drawing Sheets

(56) References Cited

FOREIGN PATENT DOCUMENTS

| JP | 2001-97276 | 4/2001 |
|----|------------|--------|
| JP | 2001-524421 | 12/2001 |
| JP | 2009-248831 | 10/2009 |
| JP | 2009-274713 | 11/2009 |
| JP | 2012-71781 | 4/2012 |
| KR | 10-2001-0032664 | 12/2002 |
| WO | 99/28180 | 6/1999 |
| WO | 2004/074084 | 9/2004 |

OTHER PUBLICATIONS

International Search Report issued Jul. 5, 2011 in International (PCT) Application No. PCT/JP2011/057805.

Korean Office Action issued Jan. 10, 2014 in corresponding Korean Patent Application No. 10-2012-7034016 with partial English translation.

Extended European Search Report issued Oct. 6, 2014 in corresponding European Patent Application No. 11828510.5.

Chinese Office Action issued Sep. 3, 2014 in corresponding Chinese Patent Application No. 201180031640.3 with partial English translation.

Korean Decision for Grant of Patent issued Sep. 29, 2014 in corresponding Korean Patent Application No. 2012-7034016 with partial English translation.

Japanese Decision to Grant a Patent issued Jan. 26, 2015 in corresponding Japanese Patent Application No. 2010-216137 with partial English translation.

* cited by examiner

AIR LUBRICATION SYSTEM OF SHIP

TECHNICAL FIELD

The present invention relates to a technique of supplying air bubbles to reduce a resistance between a ship and water. This application claims a priority based on Japanese Patent Application No. JP 2010-216137 filed on Sep. 27, 2010 and the disclosure therein is incorporated herein by reference.

BACKGROUND ART

As a technique of improving an efficiency of navigation of a ship, an air lubrication system is known. The air lubrication system is a technique for supplying air bubbles to an outer plate of the ship below a water line to reduce the friction between the ship and water and further improving the efficiency of the navigation. The technique described in JP 2009-248831A is its one example.

CITATION LIST

[Patent Literature 1] JP 2009-248831A

SUMMARY OF THE INVENTION

The inventor of the present invention is developing a technique of modifying an existing ship to install the air lubrication system externally to improve the efficiency of the navigation. In such a technique, it is demanded that the modification is easy and the reduction of frictional resistance is effective.

In a view of the present invention, an air recovering device includes a recovery side chamber provided on a bottom of a ship on a stern side from an air ejecting device which supplies air bubbles to the ship bottom, and having air intake holes formed in a portion of the recovery side chamber opposite to the ship bottom; and a recovering section recovering air inside the recovery side chamber.

In another view of the present invention, the recovering section is arranged in a different position from the air intake holes in a longitudinal direction of said ship.

In another view of the present invention, the recovering section recovers the air inside the recovery side chamber through an air recovery hole formed in the ship bottom on the stern side from the air intake holes. The recovery side chamber includes an air accumulating section extending in the longitudinal direction to accumulate the air acquired from the air intake holes such that the accumulated air is recovered through the air recovery hole.

In another view of the present invention, the air intake holes are distributed in a wider area in a width direction of the ship than said air recovery hole.

In a view of the present invention, a ship includes: an air recovering device installed in the ship bottom on the stern side from the air ejecting device; and the air ejecting device.

In a view of the present invention, a method of modifying a ship which includes an air ejecting device to supply air bubbles to a bottom of the ship, includes: installing recovery side chambers in the ship bottom on a stern side from the air ejecting device, wherein each of the recovery side chambers includes air intake holes in a portion of the recovery side chamber opposite to the ship bottom; and forming a recovering section which recovers air inside the recovery side chamber.

According to the present invention, an air recovering device, an air lubrication system and a method of modifying a ship in which the reduction of frictional resistance is effective.

Moreover, according to the present invention, in the air lubrication system that an existing ship is modified to install the air lubrication system externally, an air recovering device, an air lubrication system and a method of modifying a ship are provided.

BRIEF DESCRIPTION OF THE DRAWINGS

The above-mentioned objects, other objects, effects and features of the present invention will be clarified by the descriptions of the embodiments in linkage with the attached drawings.

DESCRIPTION OF EMBODIMENTS

Figure 1:
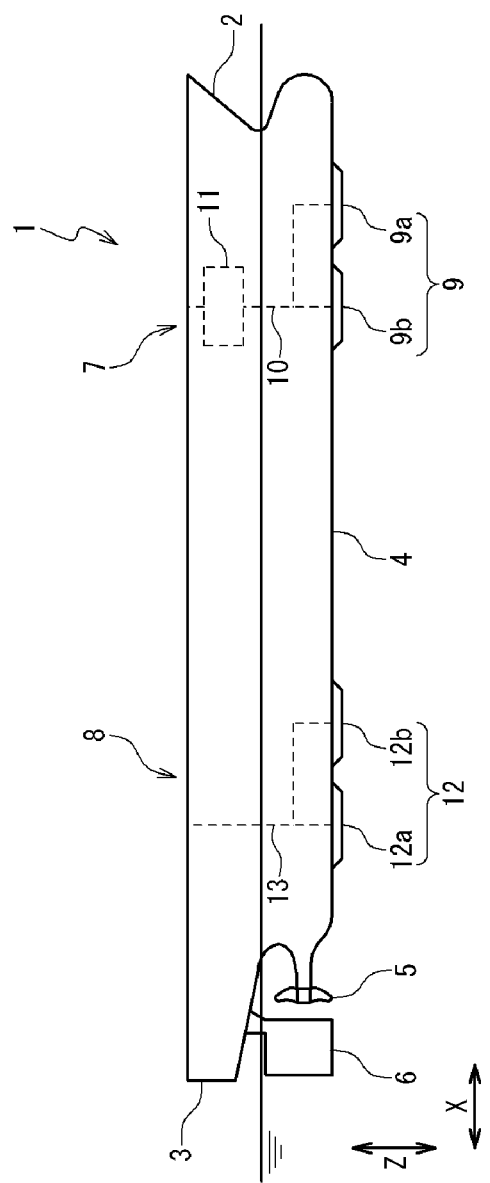
FIG. 1 is a side view of a ship.
Figure 2:
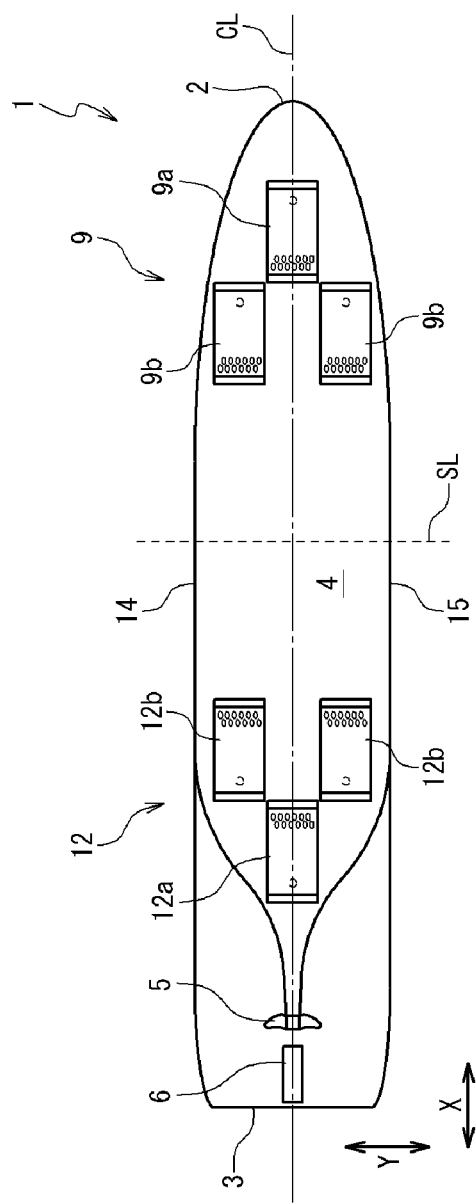
FIG. 2 is a bottom view of the ship.

Hereinafter, embodiments of the present invention will be described in detail with reference to the attached drawings. FIG. 1 is a side view of a ship to which an air recovering apparatus, an air lubrication system and a ship modifying method according to an embodiment of the present invention are applied. FIG. 2 is a bottom view when the ship is viewed from a ship bottom side. A bow 2 of a hull 1 is drawn on a right side, and a stern 3 is drawn on a left side. A propeller 5 and a helm 6 are arranged below a water line on the side of the stern 3. An air ejecting device 7 is arranged on a side closer to the bow 2 in a ship bottom 4. An air recovering device 8 is arranged on a side closer to the stern 3 of the ship bottom 4.

The air ejecting device 7 contains ejecting side chambers 9 arranged on the ship bottom 4, a pipe system 10 and a compressor 11. A blower may be used instead of the compressor 11. The compressor 11 ejects the air inside the pipe 10 to the direction of the ship bottom 4. One end of the pipe 10 is connected to an air supply hole (that will be described later) formed in an outer plate of the ship bottom 4. The ejecting side chamber 9 is attached to the ship bottom 4 in a position in which the air supply hole is formed, by welding or tightening bolts. The air inside the pipe 10 is supplied to the ejecting side chamber 9 by the compressor 11.

The air recovering device 8 contains recovery side chambers 12 and a pipe 13. One end of the pipe 13 is connected to an air recovery hole (that will be described later) formed in the outer plate of the ship bottom 4. The recovery side chamber 12 is attached to the ship bottom 4 in a position in which the air recovery hole is formed, by welding or tightening bolts. The air inside the recovery side chamber 12 is discharged through the pipe 13 to the outside or again supplied to the pipe 10 on the side of the air ejecting device 7.

In examples of FIGS. 1 and 2, a plurality of (three) ejecting side chambers 9 are attached. An ejecting side chamber 9a on a front side is attached on a central line CL of the hull 1, to be line-symmetry with respect to the central line CL. One of ejecting side chambers 9b on a rear side is attached to a position shifted on the starboard side 14 in parallel with the ejecting side chamber 9a on the front side. The other is attached to a position shifted to the port side 15 in parallel with the ejecting side chamber 9a on the front side. Accordingly, the ejecting side chambers 9b on the rear side are formed symmetrically with respect to the central line CL.

In examples of FIGS. 1 and 2, a plurality of recovery side chambers 12 are attached in correspondence to the ejecting side chambers 9. The recovery side chambers 12a and 12b on the rear side and the front side are attached in correspondence to the ejecting side chambers 9a and 9b on the front side and the rear side. Each of the recovery side chambers 12 has a shape similar to the ejecting side chamber 9 and is provided to have an orientation opposite to a direction of the hull 1. As a result, the ejecting side chambers 9 and the recovery side chambers 12 are line-symmetrical with respect to a lateral reference line SL extending in a lateral direction of the hull 1.

Figure 3:
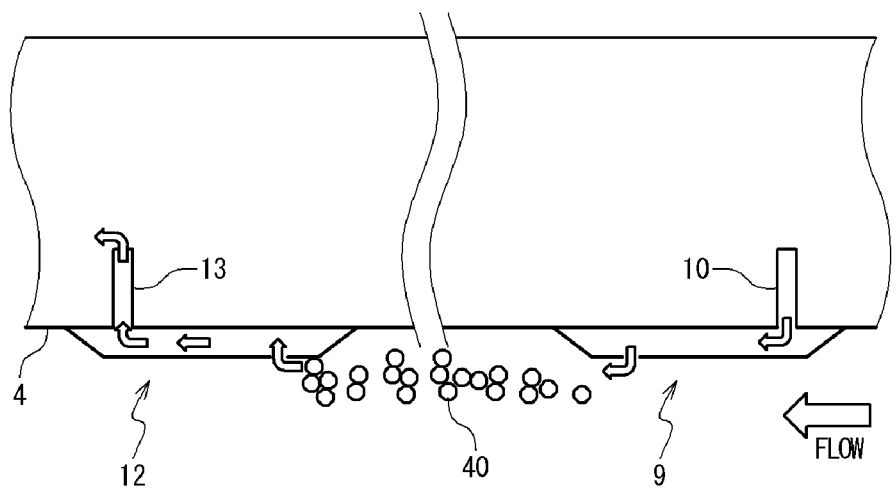
FIG. 3 schematically shows an operation of an air lubrication system.

FIG. 3 schematically shows the operation of the air lubrication system. The air is supplied from the pipe 10 to the ejecting side chamber 9. The ejecting side chamber 9 ejects the air as air bubbles 40 to external water. The air bubbles 40 flow to the stern 3 while covering the ship bottom 4. Since the ship bottom 4 is covered with the air bubbles 40, friction between the hull 1 and the water is reduced. The air bubbles 40 are captured in the recovery side chamber 12 and recovered from the pipe 13. The air bubbles 40 are recovered on the side of the bow 2 from the propeller 5. Thus, it is possible to avoid the drop in a propulsion efficiency of the propeller 5 due to the air bubbles 40.

Figure 4:
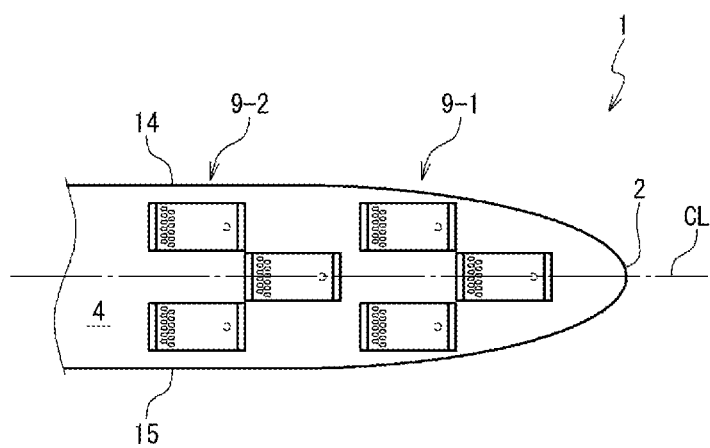
FIG. 4 shows another structural example of an ejecting side chamber.

FIG. 4 shows another configuration example of the ejecting side chambers 9. In the configuration shown in FIG. 2, the air bubbles 40 that substantially cover the width of the ship bottom 4 are provided by the three ejecting side chambers 9. On the contrary, in FIG. 4, in addition to a group of three ejecting side chambers 12-1 that substantially covers the width of the ship bottom 4, a group of three ejecting side chambers 12-2 that has the similar configuration is further placed in a position away in a length direction of the hull 1. In this configuration example, a larger number of the air bubbles 40 can be supplied to the ship bottom 4. Or, when the air bubbles 40 easily escape from the left and right sides of the ship bottom 4, so that the air bubbles 40 supplied from the ejecting side chambers 12-1 come short on the side of the stern 3, the air bubbles 40 can be supplemented from the ejecting side chambers 12-2 of a next stage. In such a case, the air bubbles 40 can be recovered by placing a plurality of groups of recovering side chambers on the side of the stern 3 line-symmetrically with a plurality of groups of ejecting side chambers 12-1, 12-2 and a group of recovery side chambers with respect to the predetermined reference line SL.

Figure 5:
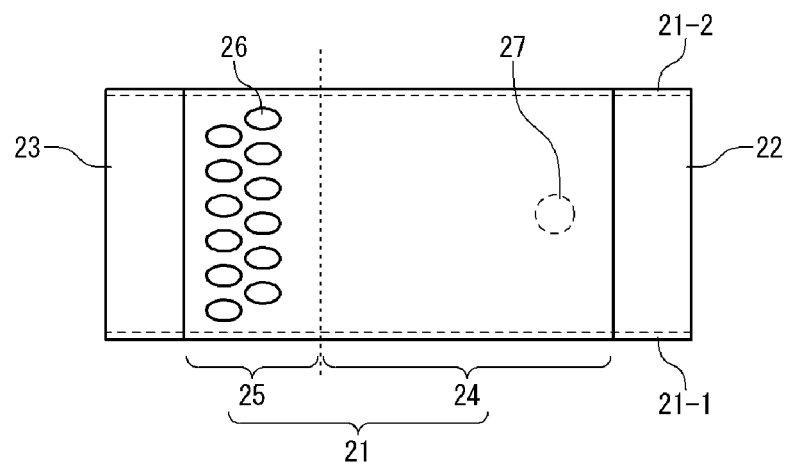
FIG. 5 is a bottom view of the ejecting side chamber.
Figure 6:
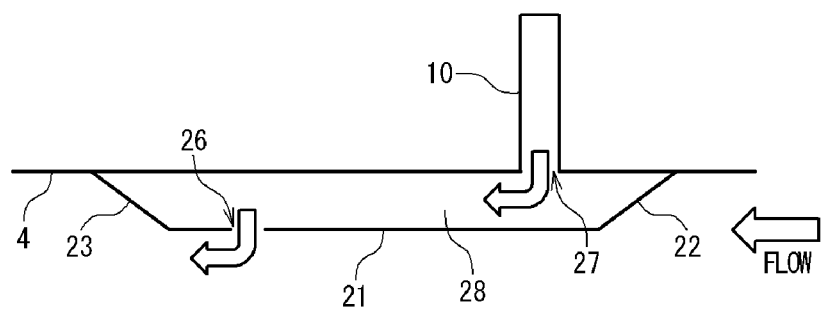
FIG. 6 is a sectional side view of the ejecting side chamber.

The configuration of the ejecting side chamber 9 will be described below. FIG. 5 is a bottom view of the ejecting side chamber 9. FIG. 6 is a sectional view when the ejecting side chamber 9 is viewed from the side thereof. The right side in each of FIGS. 5 and 6 indicates the side of the bow 2. The ejecting side chamber 9 contains a flat portion 21, a front end 22, a rear end 23, a side plate 21-1 and a side plate 21-2. The flat portion 21 is a plate-shaped member provided on the lower side of the ship bottom 4. The flat portion 21 is arranged in parallel to the ship bottom 4 or at a state almost parallel to the ship bottom 4.

The front end 22 is a plate-shaped member for connecting the ship bottom 4 and the end of the flat portion 21 on the bow 2 side. The front end 22 has a slope that approaches the ship bottom 4 toward the side of the bow 2, in order to decrease the resistance of water flow when the hull 1 navigates forwardly. The rear end 23 is a plate-shaped member for connecting the ship bottom 4 and the end of the flat portion 21 on the side of the stern 3. The rear end 23 has a slope that approaches the ship bottom 4 toward the side of the stern 3, in order to suppress the generation of eddy that serves as resistance when the hull 1 navigates forwardly and further smoothly guide the air bubbles to the ship bottom 4. The side plate 21-1 closes an opening formed from the ship bottom 4, and the portside portion of each of the flat portion 21, the front end 22 and the rear end 23. The side plate 21-2 closes an opening formed from the ship bottom 4 and the starboard side portion of each of the flat portion 21, the front end 22 and the rear end 23. An air bubble chamber 28 is formed by the flat portion 21, the front end 22, the rear end 23, the side plates 21-1 and 21-2 and the ship bottom 4 covered with them. The space of the air bubble chamber 28 communicates with the water under the ship through air ejecting holes 26 and also communicates with a pipe 10 through an air supply hole 27. The space of the air bubble chamber 28 other than the air ejecting holes 26 and the air supply hole 27 is closed.

In the design of the ejecting side chamber 9, the air bubble chamber 28 is divided into an air scattering section 24 as a region on the side of the bow 2, and an air ejecting section 25 as a region on the side of the stern 3, as shown by a dotted line on the flat portion 21 of FIG. 5. A plurality of the air ejecting holes 26 are formed in the air ejecting section 25. These air ejecting holes 26 are arranged in the width direction of the hull 1. In an example of FIG. 5, two lines of the air ejecting holes 26 are shifted to each other in a zigzag arrangement in the width direction of the hull 1.

The air supply hole 27 is formed at that position of the ship bottom 4 opposite to the air scattering section 24 which is differing from the air ejecting holes 26 (a position on the side of the bow 2 in FIGS. 5 and 6). One end of the pipe 10 is connected to the air supply hole 27. By the air scattering section 24, a predetermined distance is provided between the air supply hole 27 and the air ejecting holes 26 in the longitudinal direction of the hull 1. The existence of this distance enables the air that is supplied from the air supply hole 27 to the air bubble chamber 28 is scattered and consequently enables the air bubbles of a substantially uniform quantity to be ejected into the water from the plurality of air ejecting holes 26 arranged in the width direction of the hull 1. In order to attain the effect of the air scattering section 24, for example, a distance between a center of the air supply hole 27 and a center of the air ejecting hole 26 is desired to be set longer than the width of the air bubble chamber 28.

The air, which is supplied from the air supply hole 27 to the air bubble chamber 28, is impinged on the upper surface (inner wall surface) of the flat portion 21 due to a pressure given by the compressor 11. The supplied air is changed into the fine air bubbles due to the pressure of this impingement, and the width of a distribution is easily widen. While the air bubbles are pushed toward a downstream side inside the air scattering section 24, its distribution is expanded in a width direction.

Since the air scattering section 24 is provided, the width of the air supply hole 27 can be made smaller than the width of the air ejecting holes 26 in the width direction of the hull. In other words, by providing the air scattering section 24, the air ejecting holes 26 can be formed to be distributed in the width direction of the hull 1, even when the number of air supply holes 27 is small (one in an example of FIG. 5). Thus, the air bubbles 40 can be ejected to have a substantially uniform distribution in the width direction. Accordingly, when the ship is modified to install the air lubrication system later, the work may be reduced when the air supply hole 27 and the pipe 10 are attached to the hull 1.

A diffusion member can be further added to the ejecting side chamber 9 to diffuse the air bubbles. For example, a porous plate is provided between the air supply hole 27 and the air ejecting holes 26 to partition the air bubble chamber 28 in the longitudinal direction of the hull 1. Consequently, the finer air bubbles can be supplied to the air ejecting holes 26.

When a certain quantity of air bubbles are accumulated inside the air bubble chamber 28, the air bubbles 40 are ejected into the water under the ship bottom 4 from the air ejecting holes 26. When the ship sails, the hull 1 moves in the forward direction against the water. The water flow has a main direction from the front end 22 of the ejecting side chamber 9 to the rear end 23 on the ship bottom 4. On the contrary, since the inner space of the ejecting side chamber 9 is relatively closed, the flows of the water and air in the air bubble chamber 28 are slow, as compared with the external water flow. For this reason, when the air is ejected from the air bubble chamber 28 through the air ejecting holes 26, the air is sheared into the finer air bubbles 40 by shearing force of the external water flow and sent to the downstream side. Since a time period for which the air bubbles 40 stay on the ship bottom 4 is long, the high air lubrication effect is attained. In this way, without being supplied in its original state to the ship bottom 4, via the rear end 23 and the like, the air from the air supply hole 27 once stay in the air bubble chamber 28, and then the air is supplied to the outside so that the shearing force acts against the air. Thus, the air bubbles 40 suitable for the air lubrication are obtained.

Through the design of the shape of the air ejecting hole 26, the air bubbles 40 can be ejected more smoothly from the air bubble chamber 28 into water flows whose speeds are different in the longitudinal direction of the hull 1. In an example of FIG. 5, each of the air ejecting holes 26 has an oval shape long in the main direction of the flow, namely, in the longitudinal direction of the hull 1. The air bubbles 40 ejected from the air ejecting holes 26 rise along the rear end 23 and flow to the side of the stern 3 while covering the ship bottom 4, and then arrives at the recovery side chamber 12.

Figure 7:
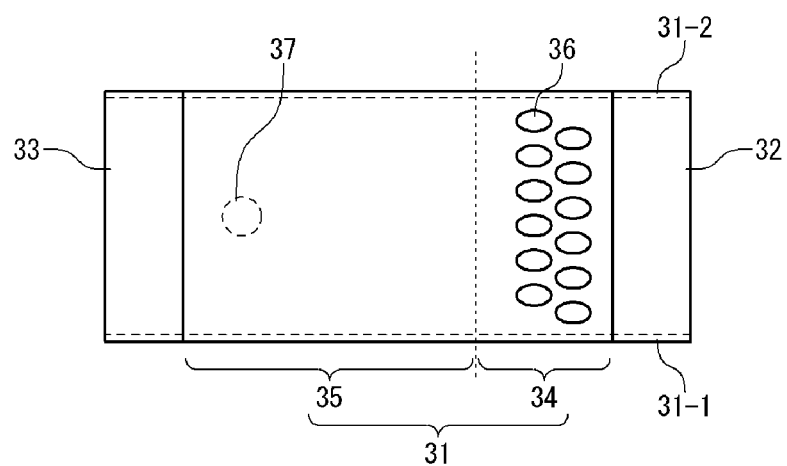
FIG. 7 is a bottom view of a recovery side chamber.
Figure 8:
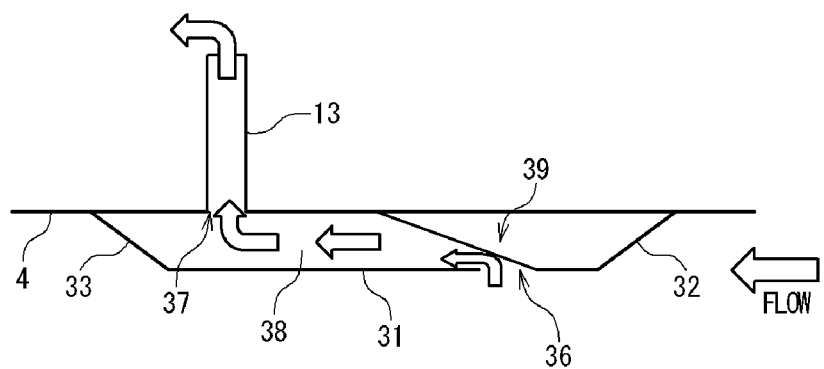
FIG. 8 is a sectional side view of the recovery side chamber.

The structure of the recovery side chamber 12 will be described below. FIG. 7 is a bottom view of the recovery side chamber 12. FIG. 8 is a sectional side view of the recovery side chamber 12. The right side of each of FIGS. 7 and 8 is the side of the bow 2. The recovery side chamber 9 has the structure similar to the ejecting side chamber 9, and this is attached to the ship bottom 4 in an opposite orientation in the longitudinal direction of the hull 1. The recovery side chamber 12 contains a flat portion 31, a front end 32, a rear end 33 and side plates 31-1 and 31-2. The flat portion 31 is a plate-shaped member provided under the lower side of the ship bottom 4 and is provided in parallel to the ship bottom 4 to have a gap.

The front end 32 is a plate-shaped member to connect the ship bottom 4 and the end of the flat portion 31 on the side of the bow 2. The front end 32 has a slope that approaches the ship bottom 4 toward the side of the bow 2, in order to decrease the resistance of the water flow when the ship sails. The rear end 33 is a plate-shaped member to connect the ship bottom 4 and the end of the flat portion 31 on the side of the stern 3. The rear end 33 has a slope that approaches the ship bottom 4 toward the side of the stern 3, in order to suppress the generation of the eddy that serves as the resistance when the hull 1 sails. The side plates 31-1 and 31-2 close side openings by the right and left sides of the recovery side chamber 12, similarly to the side plates 21-1 and 21-2 of the ejecting side chamber, and thus, the air bubble chamber 38 is formed. The air bubble chamber 38 has a space which communicates with the water under the water surface when the ship floats, through air intake holes 36 and also communicates with the pipe 13 through an air recovery hole 37, and a portion of the air bubble chamber 38 other than them is closed. The recovery side chamber 12 having such a structure can be attained by providing the ejecting side chamber 9 on the ship bottom 4 in an opposite orientation in the longitudinal direction of the hull 1.

In the design of the recovery side chamber 12, the flat portion 31 is divided into an air intake section 34 as a region on the side of the bow 2, and a pushing pressure generating section 35 as a region on the side of the stern 3, as shown by a dotted line on the flat portion 31 of FIG. 7. A plurality of the air intake holes 36 are formed in the air intake section 34, similarly to the air ejecting holes 26 of the ejecting side chamber 9.

The air recovery hole 37 is formed on at a position of the ship bottom 4 opposite to the pushing pressure generating section 35. One end of the pipe 13 is connected to the air recovery hole 37. By the pushing pressure generating section 35, the air bubble chamber 38 can be provided to have a certain degree of a volume. The air bubbles acquired from the air intake holes 36 stay in the air bubble chamber 38. Since the air bubbles once stay in the pushing pressure generating section 35, the air of some quantity is accumulated in the air bubble chamber 38. As a result, the air bubbles can be smoothly recovered from the air recovery hole 37.

In order to suppress the resistance of the water, the thickness of the recovery side chamber 12 is desired to be thin. When the length of the pushing pressure generating section 35 is set long, the sufficient volume of the air bubble chamber 38 can be attained even if the recovery side chamber 12 is thin. For this reason, for example, similarly to the ejecting side chamber 9, a distance between the center of the air intake hole 36 and the center of the air recovery hole 37 is desired to be set longer than the width of the air bubble chamber 38.

By providing a guide plate 39 in the recovery side chamber 12, it is possible to smoothly acquire the air bubbles 40. The guide plate 39 is provided inside the recovery side chamber 12 to overlap with the air intake holes 36 when viewing from the lower side. The guide plate 39 is provided to approach the ship bottom 4 in a direction from the side of the bow 2 to the side of the stern 3 in an inclined state. By the guide plate 39, the air bubbles 40 acquired from the air intake holes 36 are smoothly sent to the pushing pressure generating section 35.

Figure 9:
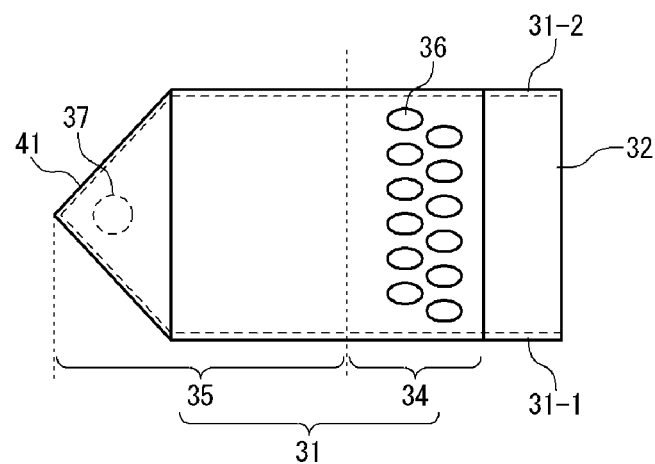
FIG. 9 is a bottom view of the recovery side chamber containing a narrowing section.
Figure 10:
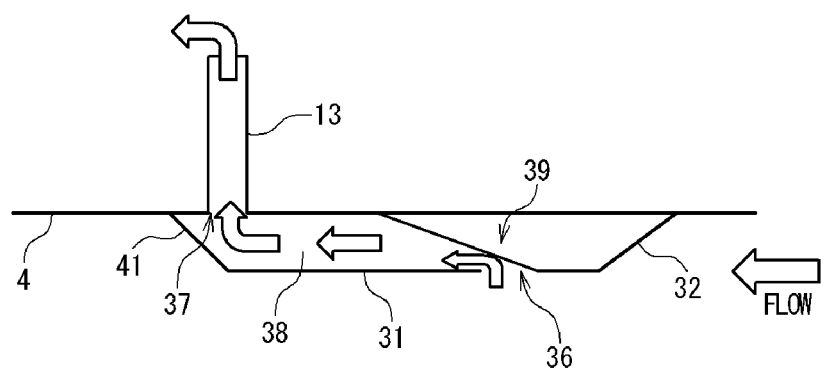
FIG. 10 is a sectional side view of the recovery side chamber containing the narrowing section.

FIGS. 9 and 10 are a bottom view and a sectional view which show the recovery side chamber in a modification example of the present embodiment. In the modification example, the recovery side chamber 12 contains a narrowing section 41 at the end thereof on its downstream side. In the narrowing unit 41, the width of the recovery side chamber 12 is narrowed to be gradually reduced toward the downstream side. More preferably, the narrowing section 41 is structured by a plate material which approaches the ship bottom 4 toward the downstream side, similarly to the rear end 33 in FIG. 8. The air recovery hole 37 is provided at an upper portion above the narrowing section 41 in the vertical direction. By such a structure, the air bubbles recovered in the air bubble chamber 38 are easily collected in the narrowing section 41, and the air bubbles can be recovered more efficiently from the air recovery hole 37.

When the existing ship is modified to install the air lubrication system in the present embodiment, the air supply hole 27 and the air recovery hole 37 are formed in the ship bottom 4. The pipe 10, the pipe 13 and the compressor 11 are provided within the ship. The ejecting side chambers 9 and the recovery side chambers 12 are provided in the ship bottom 4. In this way, it is possible to improve the efficiency of the navigation of the existing ship. Even when the air lubrication system in the present embodiment is installed for a ship to be newly manufactured, the air lubrication system can be installed under few design changes, in accordance with the similar procedure.

The structure of the air lubrication system in the present embodiment is effective in case of using only the air recovering device 8. For example, similarly to the newly-manufactured ship that contains the air lubrication system, an inner installation type ship is employed in which the chamber for ejecting the air bubbles is formed inside the hull 1 and the recovery side chamber 12 is attached from the outside. Even in this case, the same effect as the present embodiment can be attained in the air recovering device 8.

As mentioned above, the present invention has been described by referring to the embodiments. However, the present invention is not limited to the above-mentioned embodiments. Various modifications can be performed on the above-mentioned embodiments. For example, any combination of the above-mentioned embodiments in a range without any conflict with each other can be also considered to belong to the embodiment of the present invention.

The invention claimed is:

1. An air recovering device comprising:
a recovery side chamber provided at an outer surface of a bottom of a ship so as to project outwardly from the bottom of the ship, said recovery side chamber configured to receive air bubbles ejected from an air ejecting device which supplies the air bubbles to the bottom of the ship, and said recovery side chamber comprising a bottom surface opposite to the bottom of the ship, said bottom surface having an air intake hole; and
a recovering section discharging air inside said recovery side chamber through an air recovery hole formed in the bottom of the ship.

2. The air recovering device according to claim 1, wherein said air recovery hole is arranged in a different position than said air intake hole in a longitudinal direction of the ship.

3. The air recovering device according to claim 1,
wherein said air recovery hole is arranged nearer to a stern of the ship than said air intake hole, and
wherein said recovery side chamber comprises an air accumulating section extending in a longitudinal direction of the ship to accumulate the air acquired from said air intake hole such that the accumulated air is discharged through said air recovery hole.

4. The air recovering device according to claim 3, wherein said air intake hole comprises a plurality of air intake holes that are distributed in a wider area in a width direction of the ship than said air recovery hole.

5. The air recovering device according to claim 2, wherein a distance between a center of said air intake hole and a center of said air recovery hole along the longitudinal direction of the ship is longer than a width of said recovery side chamber along a direction perpendicular to the longitudinal direction.

6. The air recovering device according to claim 1,
wherein said recovery side chamber comprises a flat portion having said bottom surface, a front end portion having a slope, and a rear end portion having a slope,
wherein a first end of said front end portion is connected to said flat portion and a second end of said front end portion is connected to the bottom of the ship, and
wherein a first end of said rear end portion is connected to the bottom of the ship and a second end of said rear end portion is connected to said flat portion.

7. The air recovering device according to claim 1,
wherein said recovery side chamber comprises a narrowing section at a downstream side of said recovery side chamber, and
wherein said air recovery hole is arranged right above said narrowing section.

8. A ship comprising:
an air ejecting device supplying air bubbles to a bottom of the ship; and
an air recovering device which comprises:
a recovery side chamber provided at an outer surface of a bottom of the ship, said recovery side chamber configured to receive the air bubbles ejected from said air ejecting device, and said recovery side chamber comprising a bottom surface opposite to the bottom of the ship, said bottom surface having an air intake hole; and
a recovering section discharging air inside said recovery side chamber through an air recovery hole formed in the bottom of the ship.

9. The ship according to claim 8,
wherein said air recovery hole is arranged nearer to a stern of the ship than said air intake hole, and
wherein said recovery side chamber comprises an air accumulating section extending in a longitudinal direction of the ship to accumulate the air acquired from said air intake hole such that the accumulated air is discharge through said air recovery hole.

10. The ship according to claim 9, wherein said air intake hole comprises a plurality of air intake holes that are distributed in a wider area in a width direction of the ship than said air recovery hole.

11. A method of modifying a ship which comprises an air ejecting device to supply air bubbles to a bottom of the ship, the method comprising:
installing recovery side chambers at an outer surface of the bottom of the ship so as to project outwardly from the bottom of the ship, wherein each of the recovery side chambers comprises a bottom surface opposite to the bottom of the ship, each of the bottom surfaces having an air intake hole; and
forming a recovering section which is configured to discharge air inside each of the recovery side chambers through an air recovery hole formed in the bottom of the ship.

* * * * *